(12) United States Patent
Tofigh et al.

(10) Patent No.: US 9,112,709 B1
(45) Date of Patent: Aug. 18, 2015

(54) AD HOC SOCIAL WORK SPACE

(75) Inventors: Mostafa Tofigh, Menlo Park, CA (US);
Hossein Eslambolchi, Los Altos Hills, CA (US); Kaveh Hushyar, Menlo Park, CA (US); Behzad Nadji, Menlo Park, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2473 days.

(21) Appl. No.: 11/068,151

(22) Filed: Feb. 28, 2005

(51) Int. Cl.
*H04L 12/18* (2006.01)
*H04L 12/24* (2006.01)

(52) U.S. Cl.
CPC ........ *H04L 12/1818* (2013.01); *H04L 41/0896* (2013.01)

(58) Field of Classification Search
CPC ............ H04L 12/5695; H04L 12/1818; H04L 47/822; H04L 65/80; H04L 12/1813; H04L 12/1827; H04L 2012/5631; H04L 2012/5632; H04L 41/0896; H04L 67/1008; H04L 67/1012; H04L 67/36; G06F 9/50
USPC .......................................... 709/226, 204, 205
See application file for complete search history.

(56) References Cited

U.S. PATENT DOCUMENTS

| | | | | |
|---|---|---|---|---|
| 5,625,407 A * | 4/1997 | Biggs et al. | ................ | 348/14.11 |
| 5,742,772 A * | 4/1998 | Sreenan | ........................ | 709/226 |
| 5,854,893 A * | 12/1998 | Ludwig et al. | ................ | 709/204 |
| 6,279,039 B1 * | 8/2001 | Bhat et al. | ...................... | 709/226 |
| 6,460,082 B1 * | 10/2002 | Lumelsky et al. | ............ | 709/226 |
| 6,862,624 B2 * | 3/2005 | Colby et al. | .................. | 709/226 |
| 6,950,874 B2 * | 9/2005 | Chang et al. | .................. | 709/229 |
| 7,213,050 B1 * | 5/2007 | Shaffer et al. | ................ | 709/204 |
| 7,328,264 B2 * | 2/2008 | Babka | ........................... | 709/226 |
| 7,653,735 B2 * | 1/2010 | Mandato et al. | ............. | 709/231 |
| 8,077,635 B2 * | 12/2011 | Shaffer et al. | ................ | 370/260 |
| 8,095,409 B2 * | 1/2012 | Swanson | ...................... | 705/7.19 |
| 2002/0062376 A1 * | 5/2002 | Isoyama | ...................... | 709/226 |
| 2002/0165963 A1 * | 11/2002 | Baxley et al. | ................ | 709/226 |
| 2003/0154243 A1 * | 8/2003 | Crockett et al. | ............. | 709/203 |
| 2003/0167302 A1 * | 9/2003 | Zhu et al. | ...................... | 709/204 |
| 2004/0015953 A1 * | 1/2004 | Vincent | ......................... | 717/173 |
| 2004/0117621 A1 * | 6/2004 | Knight | ......................... | 713/165 |
| 2005/0160428 A1 * | 7/2005 | Ayachitula et al. | ........... | 718/104 |
| 2005/0198204 A1 * | 9/2005 | Takahashi | ..................... | 709/219 |
| 2005/0232153 A1 * | 10/2005 | Bishop et al. | ................ | 370/235 |
| 2006/0072541 A1 * | 4/2006 | Pecus | ............................ | 370/351 |
| 2008/0109549 A1 * | 5/2008 | Nakagawa et al. | ........... | 709/225 |
| 2009/0282404 A1 * | 11/2009 | Khandekar et al. | ............... | 718/1 |

* cited by examiner

*Primary Examiner* — Oleg Survillo (57) ABSTRACT

In accordance with the teachings of the present invention, an architecture and method is presented for proving an ad hoc work space environment. In accordance with the teachings of the present invention, an end user operates a graphical user interface (GUI) to input requirements defining an ad hoc work space. Software robots are launched and they provision network resources to implement the requirements. The end user may then collaborate with others in the ad hoc work space while activities are logged. When there is no longer a need for the ad hoc work space, the provisioned resources may be returned to the network and the ad hoc work space may be dismantled.

9 Claims, 6 Drawing Sheets

AD HOC SOCIAL WORK SPACE

BACKGROUND OF THE INVENTION

1. Field of the Invention

The present invention relates to virtual environments and specifically to virtual online environments.

2. Description of the Prior Art

Computing and communication power is steadily increasing. The increase and merger of these two technologies have spurred new and different ways of interacting and engaging in social functions. For example, video conferencing has provided a new way of interacting to perform business functions. However, although many of the computing and communications technologies are standards based on the marketplace, they are still fragmented with proprietary technologies.

Most modern networks are designed with specific applications in mind. As a result, there is very little opportunity to utilize networks outside of the parameters for which the networks were designed. For example, without a major network redesign, it is very difficult to use a low bandwidth network to deliver real-time video. On the other hand, end users may not want to pay the expense of a high bandwidth network that can transport real-time video, if the real-time video is only used a few times per year. Further, many end users would like the opportunity to use various applications on the network as needed rather than paying for an application that is used infrequently.

Thus, there is a need for a method of providing network capability that can change according to the needs and requirements of the end user.

SUMMARY OF THE INVENTION

A method and apparatus is presented for dynamically creating an online work space (i.e., network environment including the resources required to provide the environment). In one embodiment, a network includes components that are configured to automatically create a network environment for end users based on end-user selections. The network environment is dynamically created in real-time using intelligent software robots that integrate and coordinate network resources.

A variety of technologies are presented for creating the network environment. In accordance with the teachings of the present invention, a graphical user interface (GUI), intelligent software robots, and a dynamically configurable network are presented. The GUI is used to provision the network. In addition, the GUI includes the interface that an end user operates when participating in the work space. Methods of operating a software robot to create a work space are presented. Lastly, a network is presented that includes resources that can be dynamically configured to provide an ad hoc work space.

A method of creating a network environment comprises the steps of receiving work space requirements; mapping the work space requirements to network resources; configuring the network resources for operation; and integrating the network resources to create a work space.

A method of operating a network environment comprises the steps of provisioning a network for collaborative use; operating an online environment in response to provisioning the network; and upon completion of the collaborative use, dismantling the online environment.

A network comprises a registration server for receiving end-user application information, the application information defining an online-networked environment; a software robot in communication with the registration server, the software robot provisioning the network; and an online environment generated in response to the provisioning performed by the software robot.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In accordance with the teachings of the present invention, an ad hoc work space (i.e., a real-time integrated online environment) is allocated on demand. The work space can provide a virtual environment for a variety of applications, such as business, customer care, team working, entertainment, etc.

In one embodiment, the work space includes a set of default resources, such as storage, computing and network bandwidth, and a set of optional applications that are integrated for specific work space request. For example, students can virtually work and study together when given a set of studying tools on the virtual work space including white board, a set of e-books, e-materials, audio tools, conferencing tools, lecture materials, and related guided study application tools. These resources can be requested on demand and returned to a pool of resources when work activity has paused or is complete.

Business users can request work space and invite their customers for professional exchange and collaboration. Social team members can request a work space to coordinate, schedule and agree on action items. In this scenario, the network resources (i.e., tools) may automatically capture, discover, and distribute action items followed by reminders and alerts. In another embodiment, government users can request virtual mediation with members of the court, with related facts about their case, and plans for future steps presented in the work space environment.

In accordance with the teachings of the present invention, an ad-hoc network (i.e., ad hoc wordspace) of nodes is formed. The ad hoc work space is a temporarily formed network, created, operated, and managed by the nodes themselves. It is also often termed an infrastructure-less, self-organized, or spontaneous network. The ad hoc work space can be rapidly deployed and does not rely on pre-existing infrastructure. In addition, the ad hoc network may include a set of nodes that continuously change and self-adapt to the connectivity and propagation patterns, traffic, and mobility patterns of end users.

Figure 1:
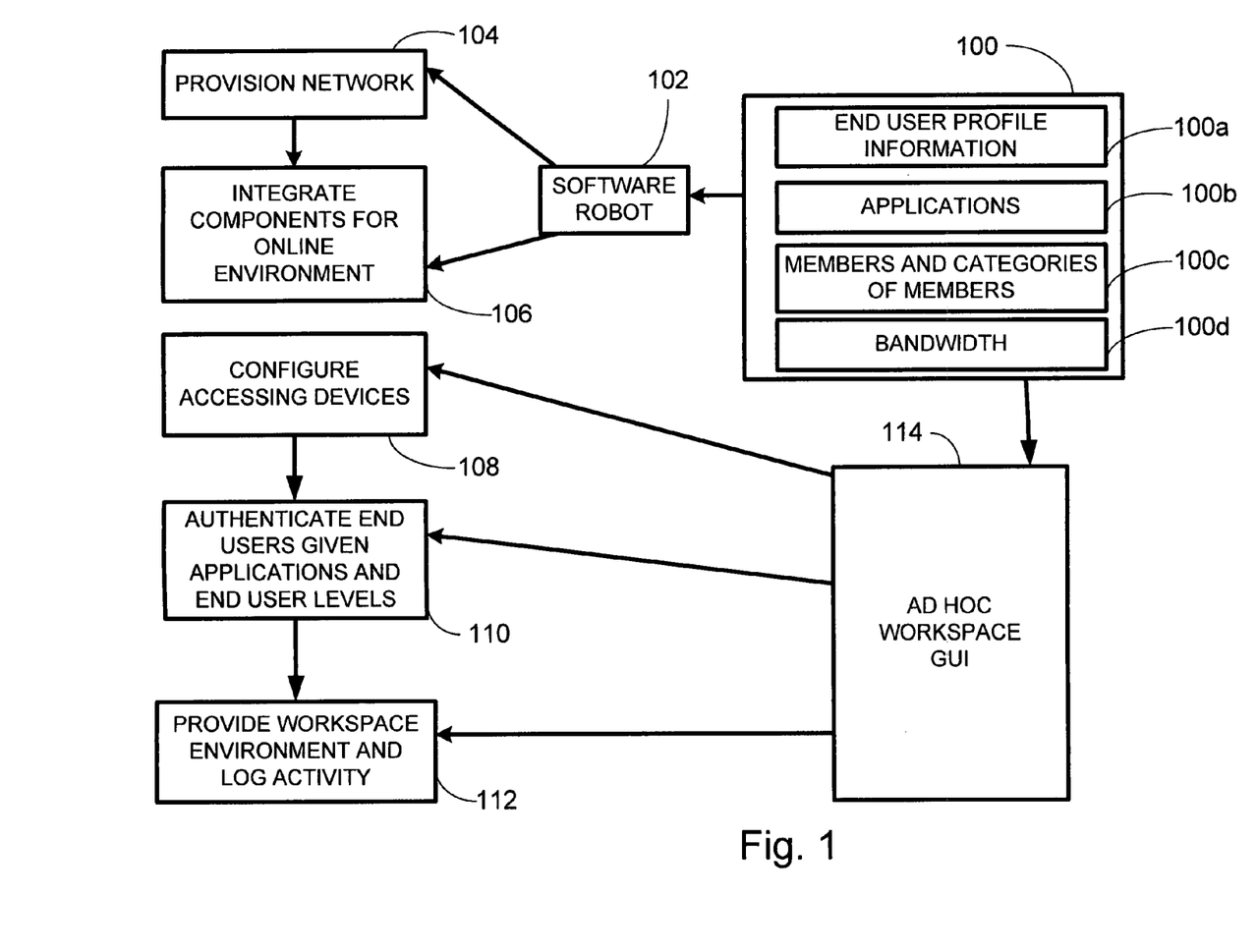
FIG. 1 displays a conceptual drawing integrated with a flow diagram that depicts a method of operating a graphical user interface to dynamically provision a network.

FIG. 1 displays a conceptual drawing integrated with a flow diagram that depicts a method of operating a graphical user interface to dynamically provision a network. In accordance with the teachings of the present invention, a registrant interfacing with a GUI defines an online work environment including the applications, members, categories of members, security levels, digital rights, bandwidth, etc. Although a small subset of applications and options are presented, it should be appreciated that all of the aspects of the ad hoc work space experience may be defined using the graphical user interface (GUI) 100. Further, the GUI 100 may be accessible from anywhere, using a variety of access technologies.

A registration GUI 100 is shown. The registration GUI 100 is the initial GUI 100 that a registrant would encounter when signing-up for the ad hoc work space service. The registration GUI 100 may be accessed through any form of online access mechanism, such as a web browser in a computer, a wireless personal data assistant (PDA), etc.

In the registration GUI 100, the end user is provided with the selections (i.e., options) required to set up the ad hoc work space environment. For example, an end user may go to a web page presented by a service provider and the web page would include the various options that the end user could select to establish the ad hoc work space environment. The end user may then select the exact work space environment that he requires toggling selections in the GUI 100. For example, the registration GUI 100 may have input screens or pull-down screens for selecting specific aspects of the ad hoc work space environment.

Various selections (100*a*, 100*b*, 100*c*, 100*d*) are shown in the registration GUI 100. It should be appreciated that the selections are provided as an example and additional selections may be presented. If a user has already registered for the ad hoc work space service, the user may select their specific end-user profile information 100*a*. However, if the end user has not previously registered for the ad hoc work space service, a series of questions or input screens may be presented to the end user to allow the end user to enter personal data, such as name, address, password, credit card, etc.

An applications 100*b* selection is presented. The end user may select the type of applications 100*b* that they are going to use as part of the ad hoc work space service. For example, the registrant may select a meeting software, a whiteboard software, an accounting or spreadsheet package, video conferencing, etc. Using the applications selection 100*b*, the registrant can select all of the different types of applications that will be made available to the end users that participate in the ad hoc work space environment. In an alternate embodiment, selecting one type of application, such as real-time video, may result in a listing of pre-configured resources being presented to the end user so that the end user may then select from the list of pre-configured resources.

The registrant can specify the members and the categories of member's 100*c* in the ad hoc work space. Therefore, the registrant may be able to select whether there are 2 members or 2000 members that should participate in the ad hoc work space environment. Further, the categories of members may be specified. For example, executives may have more privileges than non-executives, members in the teacher category may want the ability to edit material while members in the student category may just have the ability to view material, etc. Further, the registrant may be able to separate end users by organization or geographical reference. It should be appreciated that any variety of categories may be implemented. The registrant may be able to select the amount of bandwidth using the bandwidth selection 100*d*. As such, if the registrant expects 2000 employees performing video conferencing, the registrant may pay to increase the bandwidth to levels that the registrant thinks are appropriate.

It should be appreciated that the selections are just a small subset of selections available to an end user. It should further be appreciated that the selections may be integrated with each other. For example, if 2000 end users are specified and video-on-demand services are selected as an application, then a suggested level of bandwidth may be presented to the registrant with the option of increasing or decreasing the bandwidth level.

Once all of the selections have been made, a software robot 102 is initiated to implement the selections. The software robot 102 may be any hardware, software, or combination thereof that organizes and integrates resources in the network to create the ad hoc work space environment. In one embodiment, the software robot 102 provisions the network as stated at 104, integrates components to form an ad hoc work space as stated at 106, identifies the components and configures accessing devices as stated at 108, identifies the components that authenticate the end users given applications and end-user levels as stated at 110, and deploys the network components that provide the work space environment and logs activity as stated at 112.

It should be appreciated that the software robot 102 may be implemented in a centralized or distributed architecture. The software robot 102 may be implemented by a single batch of code or by multiple routines and algorithms deployed throughout a network. In addition, the software robot 102 may be implemented with anything from a high-level software language to machine language.

The software robot 102 provisions the network as stated at 104. Provisioning the network 104 includes identifying and obtaining the resources required to implement the ad hoc work space given the selections of the registrant. For example, given the applications chosen, a listing of resources that are required to implement the ad hoc work space may be defined. For example, T1 lines may be necessary, a certain amount of memory may be necessary, if video is required, minimum bandwidth requirements may be necessary to maintain a certain quality of service (QOS), etc. The software robot 102 may then integrate the various components. The software robot 102 may define an account number for the ad hoc work space and store all the video sequences generated during an ad hoc work space session. In addition, the software robot 102 identifies and integrates the background software required to support the registrants' choices. For example, the software required to configure end-user devices is identified and operated (i.e., directly or indirectly), the software required to perform authentication is identified and integrated, the GUI that will be presented to end users is identified and integrated, and the software used to perform log activities is identified and integrated by the software robot 102.

Once all of the components identified by the registrant are put in place, the ad hoc work space is available and an online session may begin. For example, the registrant GUI 100 may be replaced by an ad hoc work space GUI 114. The ad hoc work space GUI 114 will be dynamic and will change depending on the applications selected by the registrant and based on the end-user device. For example, if the registrant selected a white board, the ad hoc work space GUI 114 would present the whiteboard. If the registrant selected video conferencing, the ad hoc work space GUI 114 would present video conferencing. In addition, if the end user was on a browser operating on a workstation, the end user would have one ad hoc work space GUI 114 presented. On the other hand, if the end user was on a PDA, the end user would see another ad hoc work space GUI 114.

In one embodiment, when the end user operates the ad hoc work space GUI 114 to log into the ad hoc work space, the software for configuring the end-user device, as stated at 108, is pre-provisioned and integrated by the software robot 102. For example, the software robot 102 may identify wireless video resources that support video on a PDA. The wireless video resources may be deployed in the network. When the end user accesses the ad hoc work space with a wireless PDA, the wireless PDA may be directed to a server, such as a Session Initiation Protocol (SIP) server that senses the wireless PDA and downloads client software to the wireless PDA so that the wireless PDA can receive video streaming content. The end user may then use the ad hoc work space GUI 114 to login to the ad hoc work space and enter a password. In one embodiment, the software robot 102 may pre-provisioned the software required to authenticate end users, given selected applications and end-user security levels; therefore, the end user is taken through an authentication sequence as stated at 110. Lastly, the end user operating the ad hoc work space GUI 114 may then participate in the online environment and the information generated in the online work space environment is logged. As with the other components, the software required to provide the work space environment and the software required to log the online activity 112 are provisioned by the software robot 102. Therefore, the end users can then participate in an ad hoc work space.

Figure 2:
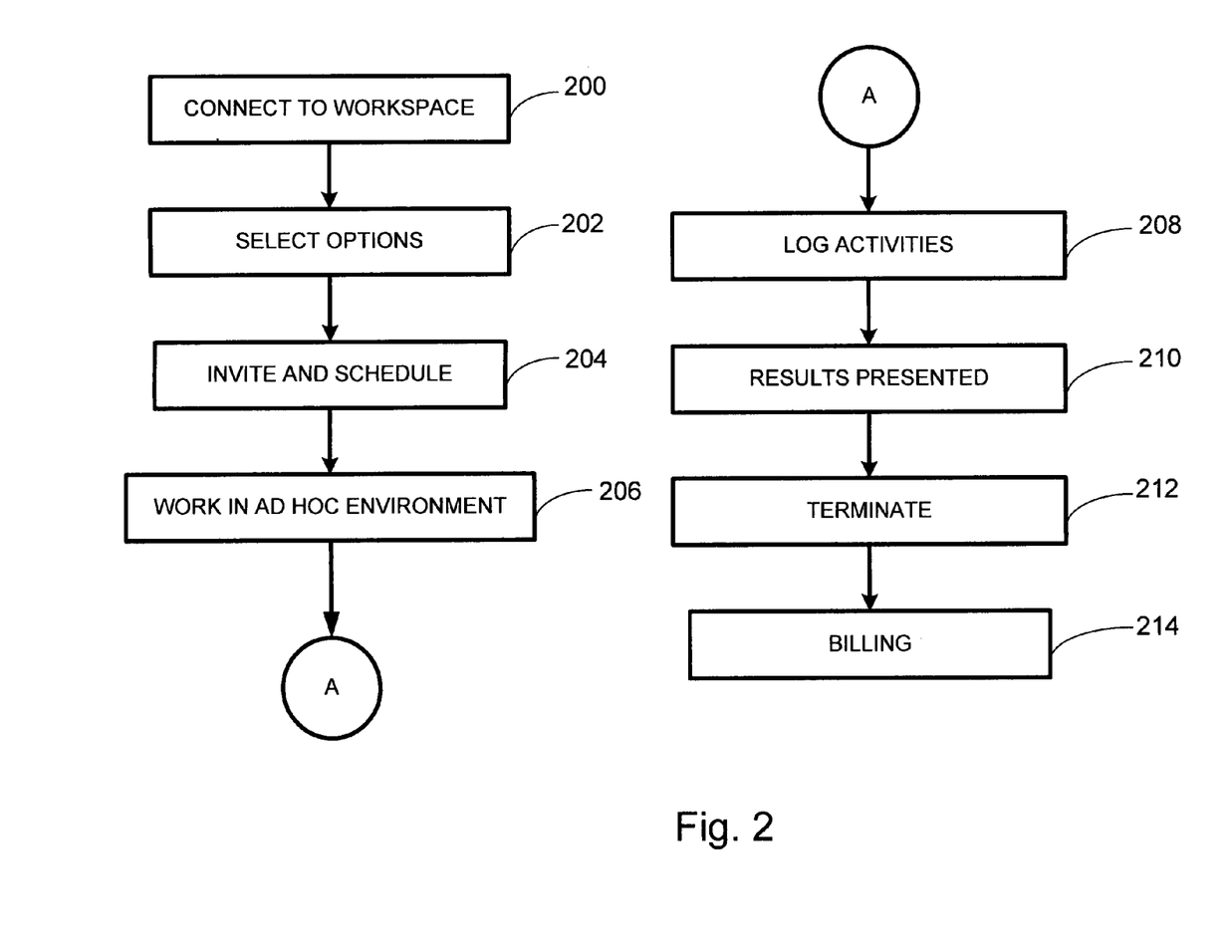
FIG. 2 displays a flow diagram that depicts a method of operating a graphical user interface to operate an ad hoc network.

FIG. 2 displays a flow diagram that depicts a method of operating a graphical user interface to operate an ad hoc network. At step 200, a registrant (i.e., person organizing the ad hoc work space, specific type of end user, in some cases a general end user identified to organize the ad hoc work space, etc.) will connect to an ad hoc work space data center. At step 202, the registrant picks options for their work space environment and may pay for their specific selected work space environment. At step 204, the registrant may invite members (i.e., which may or may not include the registrant) and schedule a time to start cooperative activities. At step 206, members start work while virtual applications are tracking and coordinating member behavior and real time demands. At step 208, all activities are logged and characterized by subject matters selected by the members. At step 210, results are presented for archival, editing, viewing, and forwarding by the work space host. At step 212, the work space session is terminated and resources are returned to a network pool. For example, super work space may be another layer of service that coordinates collaborative work among subgroups in the virtual space. At step 214, billing is performed.

In accordance with the teachings of the present invention, software robots are defined to identify and integrate network resources to create the ad hoc work space. The ability to access network services from any place in the world and from an ever-growing variety of devices provides the opportunities for service providers to architect the concept of a software robot. The software robot provides a marriage between the end-users' devices and a service providers' network and service infrastructure. In accordance with the teachings of the present invention, software robots are implemented as the next-generation, intelligent agents that will be responsible for service an application enablement, traffic aggregation, distribution, and session management to and from surrounding devices.

In one embodiment, the software robots are implemented as software robot servers and software robot clients. The software robot servers are implemented in distributed edge intelligent servers complimented by software robot clients that run at the heart of millions of smart end-users' devices. The software robot servers provide access services responsible for discovery, aggregation, session management, security, and distribution of contents, media, stream, text, and control data to and from end-users' devices.

The services performed by the software robots include adoption to policy dynamics, security control, providing dashboard view of network services to the end device, providing ad-hoc service enablement, providing multimedia service enablement, accessing core network applications, such as search engines, location-based services, etc.

Networks integrated with the software robots are responsible for communications with the software robot servers. The applications will need to respond to millions of request to/from end-users' smart devices. The service centers are responsible for user management and the marriage of end devices to service provider network-enabled applications and services. The software robots provide visibility into end-users' policy with respect to network dynamics, while providing proactive new and enhanced services to the end devices without end-user interaction. The software robot service centers are designed to lower the capital and operating expenses per subscriber.

The software robots will attach themselves to a service provider network instantly to provide end-users' devices with their profiles, policies, and related full-state information based on the dynamics of the end-users' devices. The software robot is in continuous communication with application aware network for enhanced instant access to desired end-user services. In summary, a software robot is a point of presence with a multitude of access services to emerging Internet Protocol aware devices. Therefore, software robot client software may be downloaded to a variety of current and future end-users' devices. Where higher hardware performance is required, software robot access services will be integrated into a system on chip solution for integration with service provider Voice-Over-IP (VOIP) terminal adapters and appropriate standard I/O slots.

The software robots may be deployed to implement a number of applications, such as software robot homes, software robot business, etc. Software robots agents are downloadable to any smart device, which can connect itself to the Internet. Examples of smart devices are cell phones, PDAs, laptops, SIP phones, set-top boxes, emerging digital cameras with network cards, and other network enabled IP aware devices. By downloading the software robot core and optional stacks, end devices become much more sophisticated and will have access to many network-enabled applications provided by service providers. In addition, these devices become the point of aggregation, collection, and a control gateway becomes a network intelligent service enabler instantly.

Software robot agents running on smart end devices offer tremendous business and personal advantages. They personalize end-user networking needs based on a set of self-learning, adaptive policies. These policies are continually updated and kept at service provider domains. As the end users utilize multiple end devices, these profiles are automatically optimized based on each end-device capability. Users of software robot agents will not have to worry about moving their policies and profiles from one device to another. Once a user is authenticated and a software robot services request is received at the service provider, the agent software is automatically downloaded to the end-users' devices and is ready to launch the end-users' services.

Figure 3:
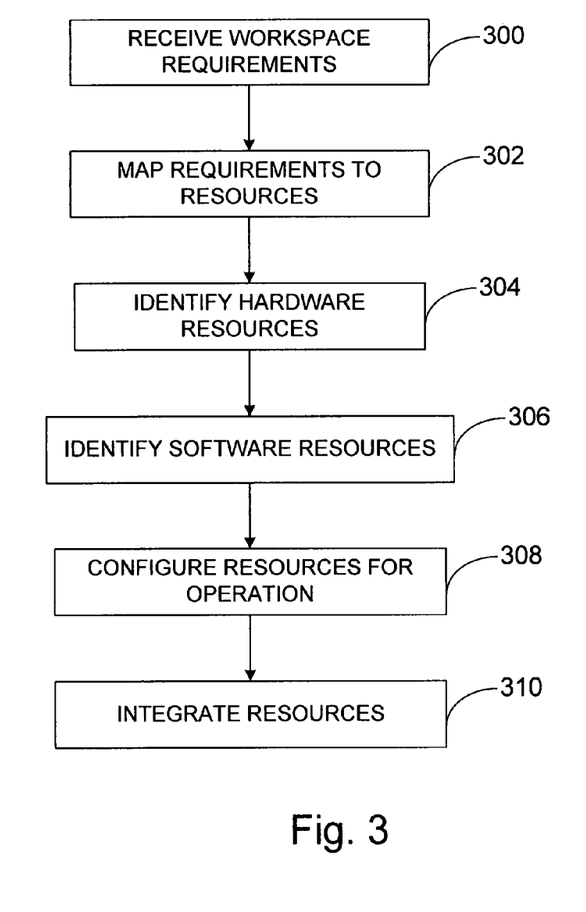
FIG. 3 displays a flow diagram depicting a method of operating an intelligent software robot.

FIG. 3 displays a flow diagram depicting a method of operating an intelligent software robot. At step 300, a software robot will receive the work space requirements. The work space requirements 300 include the selection made by a registrant to define the work space. This may include the application requirements, the security requirements, the storage requirements, etc. As shown at 302, the software robot then maps the parameters to network resources required to implement the ad hoc work space. For example, if video on demand is selected, a certain amount of storage and bandwidth is necessary. At 304, the software agent then determines the hardware required to implement the requirements. For example, the software robot would identify where in the network the required memory and T1 lines are located to implement video-on-demand service in an ad hoc work space.

At step 306, the software robot identifies the location, access rights, licensing rights, etc. of the software that is required. This may include software drivers for end-user devices, authentication software, etc. It should be appreciated that steps 304 and 306 may be switched and step 306 may occur before step 304 or in the alternative. The identification of hardware and software resources may be an iterative process. In one embodiment, both the hardware resources and the software resources are disparate and/or distributed resources that may be located at different locations in the network. For example, the hardware resources may be implemented by combining different platforms. Software resources may include a variety of different applications such as word processing applications, white board applications, voice communication applications, etc. As such, the software robot would integrate these disparate resources into a cohesive working unit to form the network and applications required by the ad hoc work space. In some applications, the resources may be owned by different owners or have different access rights and requirements. For example, different owners may lease or rent their resources for use during down times, etc.

At step 308, the software robot may configure resources. For example, the appropriate user names and passwords are associated with the video-on-demand application. Lastly, at step 310, the software robot then integrates the resources. For example, the video-on-demand software may be directed to store the video on a specific server that has the identified memory resources.

Figure 4:
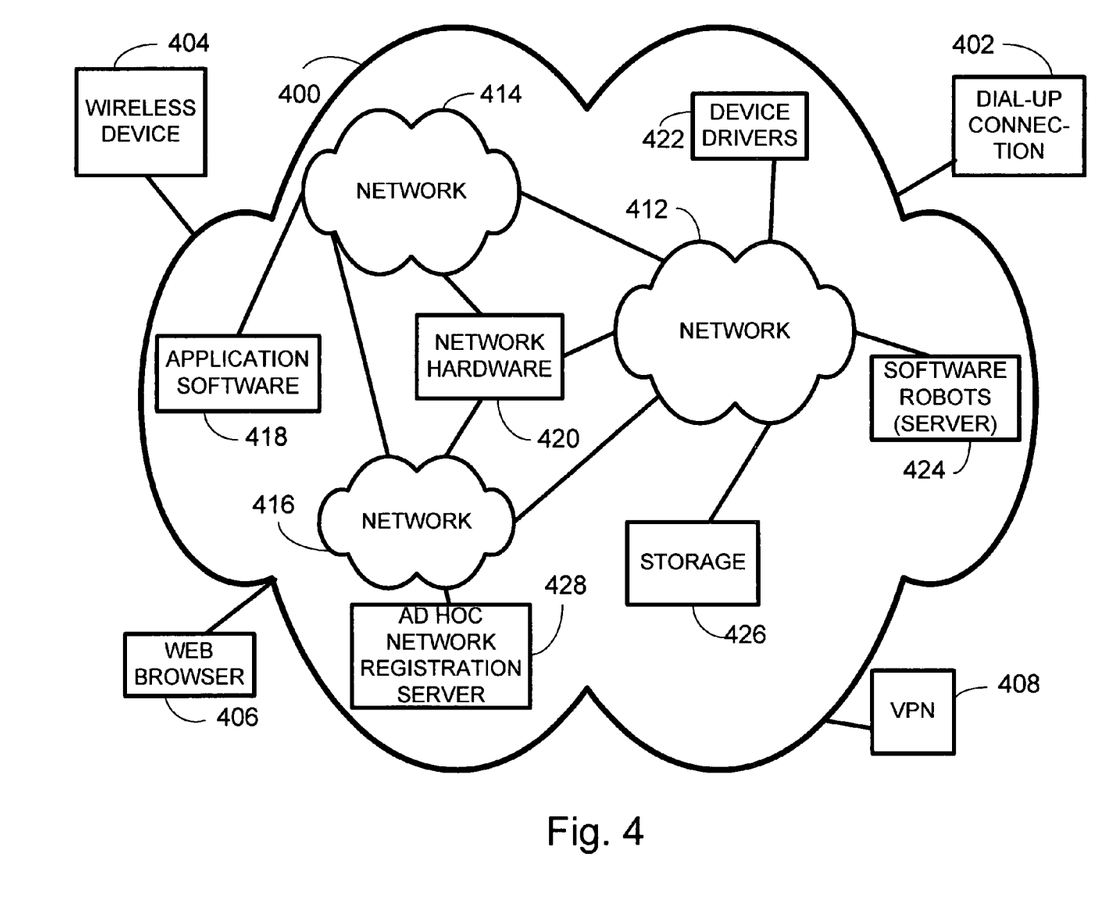
FIG. 4 displays a network architecture implemented in accordance with the teachings of the present invention.

FIG. 4 displays an embodiment of a network architecture implemented in accordance with the teachings of the present invention. Various access technologies for accessing a network 400 are shown. For example, a wireless device 404, a dial-up connection 402, a web browser 406, and a VPN 408 are each shown. A registrant or an end user may use one of the devices to access the network 400. Sub-networks 412, 414, and 416 are shown within network 400. The sub-networks (412, 414, 416) may be public networks, private networks, computer clusters, local area networks, wireless networks, optical networks, etc. A software robot server 424 is shown. The software robot server 424 stores the software robot. The ad hoc network registration server 428 is shown. In addition, a variety of network resources are shown, such as device drivers 422, network hardware 420, applications software 418, storage 426, etc.

Figure 5:
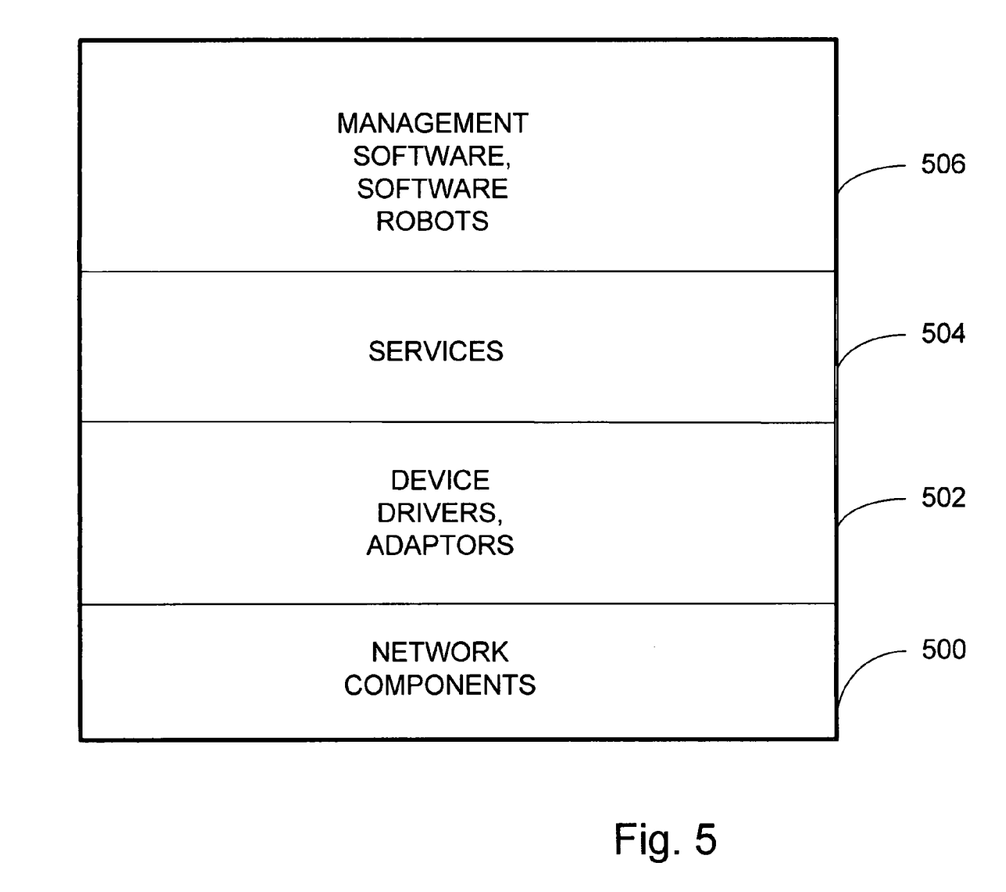
FIG. 5 displays a system architecture implemented in accordance with the teachings of the present invention.

FIG. 5 displays a layered architecture implemented in accordance with the teachings of the present invention. A network and components level is shown as 500. Device drivers and adaptors are shown as level 502. The various services that can be offered are shown as level 504. Lastly, management software and software robots are shown at level 506. It should be appreciated that depending on the type of software robot implementation, the software robot may be found at level 500, 502, 504, or 506. Further, the layered architecture shown in FIG. 5 is just one embodiment of a layered architecture implemented in accordance with the teachings of the present invention.

Figure 6:
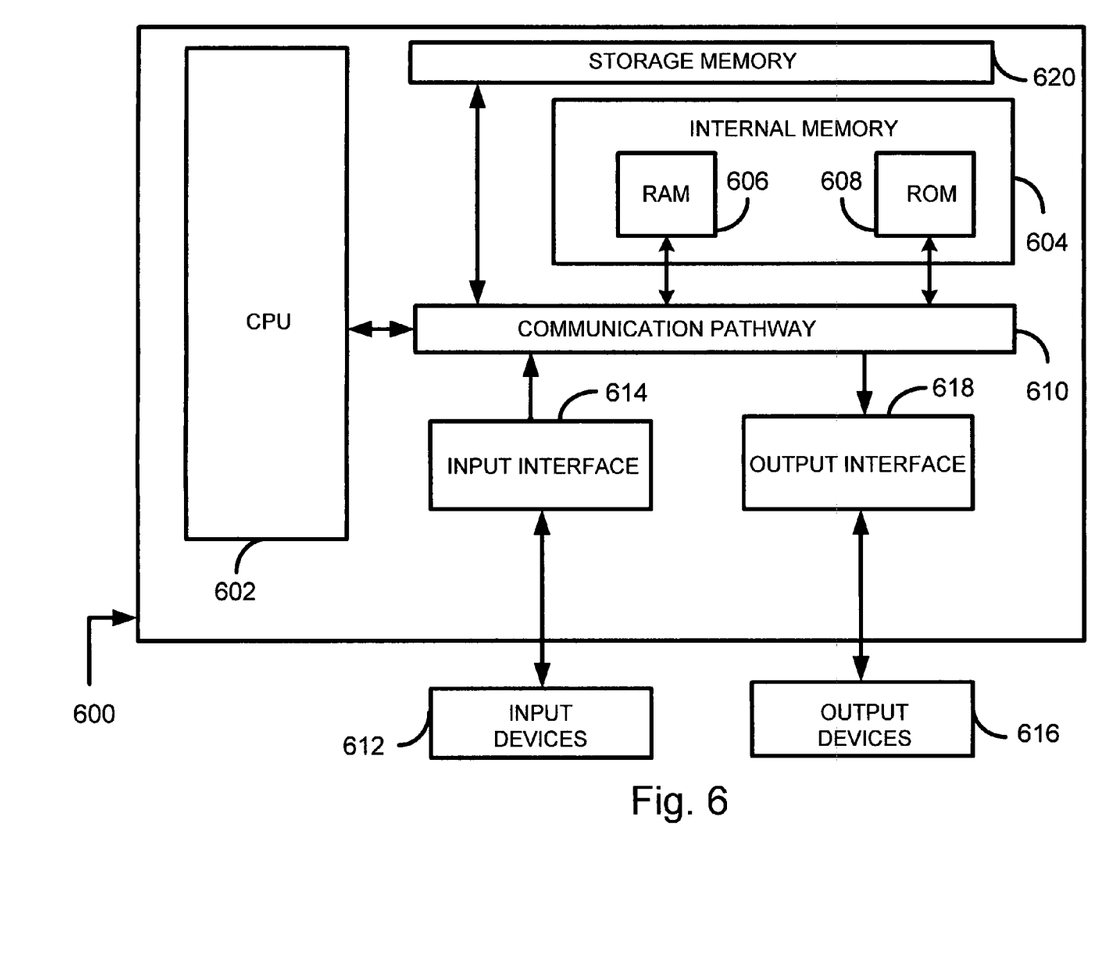
FIG. 6 displays a computer architecture used to implement the teachings of the present invention.

FIG. 6 displays a computer architecture used to implement the teachings of the present invention. The components shown in FIGS. 1 and 4 may be implemented with the computer shown in FIG. 6. Further, the methods shown in FIGS. 2 and 3 may be implemented with the computer shown in FIG. 6.

A central processing unit (CPU) 602 functions as the brain of the computer 600. Internal memory 604 is shown. The internal memory 604 includes short-term memory 606 and long-term memory 608. The short-term memory 606 may be a Random Access Memory (RAM) or a memory cache used for staging information. The long-term memory 608 may be a Read Only Memory (ROM) or an alternative form of memory used for storing information. Storage memory 620 may be any memory residing within the computer 600 other than internal memory 604. In one embodiment of the present invention, storage memory 620 is implemented with a hard drive. A communication pathway 610 is used to communicate information within computer 600. In addition, the communication pathway 610 may be connected to interfaces, which communicate information out of the computer 600 or receive information into the computer 600.

Input devices, such as tactile input device, joystick, keyboards, microphone, communications connections, or a mouse, are shown as 612. The input devices 612 interface with the system through an input interface 614. Output devices, such as a monitor, speakers, communications connections, etc., are shown as 616. The output devices 616 communicate with computer 600 through an output interface 618.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of creating a network environment, comprising:

receiving, via a software robot server located in a network, work space requirements, wherein the work space requirements comprise an application selected by a user to be provided in an ad hoc work space, a plurality of members selected by the user to participate in the ad hoc work space, a required memory amount selected by the user to be provided in the ad hoc work space, and a required bandwidth amount selected by the user to be provided in the ad hoc work space, wherein the application selected by the user is selected from among a plurality of different applications that is available and that is presented to the user, wherein, after the application is selected by the user, a plurality of options is provided to the user, the plurality of options comprising: a suggested memory amount, a suggested bandwidth amount, an option for a memory amount that is greater than the suggested memory amount, and an option for a bandwidth amount that is greater than the suggested bandwidth amount, wherein the required memory amount and required bandwidth amount are selected by the user from among the plurality of options that is provided;

mapping, via the software robot server, the work space requirements to network resources, wherein the mapping comprises identifying from among a plurality of hardware a memory and a bandwidth available to satisfy the required memory amount and the required bandwidth amount, wherein each one of the plurality of hardware is in a different location, and identifying a location and an access right of a software application that is required for the work space requirements;

configuring, via the software robot server, the network resources for operation;

integrating, via the software robot server, the network resources to create the ad hoc work space comprising the work space requirements;

identifying, via the software robot server, software needed by an endpoint device of the user to support the application selected by the user; and providing, via the software robot server, the software to configure the endpoint device of the user.

2. The method of creating the network environment as set forth in claim 1, wherein the method is performed on demand.

3. The method of creating the network environment as set forth in claim 1, wherein the network resources include computing hardware.

4. The method of creating the network environment as set forth in claim 1, wherein the configuring the network resources further comprises setting parameters associated with the network resources so that the network resources would interoperate.

5. The method of creating the network environment as set forth in claim 1, wherein the integrating the network resources further comprises operating the network resources to create the ad hoc work space.

6. The method of creating the network environment as set forth in claim 1, wherein the network resources are distributed across the network.

7. The method of creating the network environment as set forth in claim 1, wherein the network resources have varying levels of access rights.

8. The method of creating the network environment as set forth in claim 1, wherein the network resources are borrowed network resources.

9. A software robot server for creating a network environment, comprising:

a processor; and a non-transitory computer-readable medium storing instructions which, when executed by the processor, cause the processor to perform operations, the operations comprising:

receiving work space requirements, wherein the work space requirements comprise an application selected by a user to be provided in an ad hoc work space, a plurality of members selected by the user to participate in the ad hoc work space, a required memory amount selected by the user to be provided in the ad hoc work space, and a required bandwidth amount selected by the user to be provided in the ad hoc work space, wherein the application selected by the user is selected from among a plurality of different applications that is available and that is presented to the user, wherein, after the application is selected by the user, a plurality of options is provided to the user, the plurality of options comprising: a suggested memory amount, a suggested bandwidth amount, an option for a memory amount that is greater than the suggested memory amount, and an option for a bandwidth amount that is greater than the suggested bandwidth amount, wherein the required memory amount and required bandwidth amount are selected by the user from among the plurality of options that is provided, wherein the software robot server is located in a communication network;

mapping the work space requirements to network resources, wherein the mapping comprises identifying from among a plurality of hardware a memory and a bandwidth available to satisfy the required memory amount and the required bandwidth amount, wherein each one of the plurality of hardware is in a different location, and identifying a location and an access right of a software application that is required for the work space requirements;

configuring the network resources for operation;

integrating the network resources to create the ad hoc work space comprising the work space requirements;

identifying software needed by an endpoint device of the user to support the application selected by the user; and providing the software to configure the endpoint device of the user.

* * * * *